United States Patent
Tang et al.

(10) Patent No.: US 7,209,449 B2
(45) Date of Patent: Apr. 24, 2007

(54) SYSTEMS AND METHODS FOR UPDATING ROUTING AND FORWARDING INFORMATION

(75) Inventors: Puqi Tang, Portland, OR (US);
Hsin-Yuo Liu, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1039 days.

(21) Appl. No.: 10/109,558

(22) Filed: Mar. 27, 2002

(65) Prior Publication Data

US 2003/0185226 A1    Oct. 2, 2003

(51) Int. Cl.
*H04J 1/16* (2006.01)

(52) U.S. Cl. .................. 370/238; 370/392; 709/242

(58) Field of Classification Search ............... 370/238, 370/389, 392, 352–356, 400, 401, 217, 248, 370/396; 709/238–242, 237; 714/4
See application file for complete search history.

(56) References Cited

U.S. PATENT DOCUMENTS

| | | | |
|---|---|---|---|
| 5,570,359 A | 10/1996 | Nguyen | 370/401 |
| 6,041,355 A | 3/2000 | Toga | 709/221 |
| 6,055,561 A | 4/2000 | Feldman et al. | 709/200 |
| 6,069,889 A | 5/2000 | Feldman et al. | 370/351 |
| 6,088,803 A | 7/2000 | Tso et al. | 726/22 |
| 6,108,786 A | 8/2000 | Knowlson | 726/11 |
| 6,130,889 A | 10/2000 | Feldman et al. | 370/397 |
| 6,148,000 A | 11/2000 | Feldman et al. | 370/397 |
| 6,157,955 A | 12/2000 | Narad et al. | 709/228 |
| 6,163,531 A | 12/2000 | Kumar | 370/260 |
| 6,185,625 B1 | 2/2001 | Tso et al. | 709/247 |
| 6,202,084 B1 | 3/2001 | Kumar et al. | 709/204 |
| 6,233,686 B1 | 5/2001 | Zenchelsky et al. | 726/1 |
| 6,236,996 B1 | 5/2001 | Bapat et al. | 707/9 |
| 6,237,031 B1 | 5/2001 | Knauerhase et al. | 709/221 |
| 6,246,678 B1 | 6/2001 | Erb et al. | 370/352 |
| 6,311,215 B1 | 10/2001 | Bakshi et al. | 709/211 |
| 6,704,795 B1* | 3/2004 | Fernando et al. | 709/237 |
| 6,751,191 B1* | 6/2004 | Kanekar et al. | 370/217 |
| 6,801,525 B1* | 10/2004 | Bodnar et al. | 370/352 |
| 6,910,148 B1* | 6/2005 | Ho et al. | 714/4 |

* cited by examiner

*Primary Examiner*—John Pezzlo
(74) *Attorney, Agent, or Firm*—Fish & Richardson P.C.

(57) ABSTRACT

A forwarding system including a plurality of forwarding elements to receive and transmit data and a control element to receive and process route updates, the control element being connected to the forwarding elements and including at least one route management component to transmit one or more route updates to the forwarding elements and synchronize the commitment of the route updates by the forwarding elements.

31 Claims, 5 Drawing Sheets

SYSTEMS AND METHODS FOR UPDATING ROUTING AND FORWARDING INFORMATION

TECHNICAL FIELD

Certain illustrative embodiments described herein relate to devices and processes for routing packets of information in network communications and, more specifically, to systems and methods for implementing route updates.

BACKGROUND

Networks of computers such as intranets, local and wide area networks, and public networks such as the Internet can exchange information in "packets." A packet includes data such as files and programs and can also include a header that contains information that identifies the packet and indicates its origin and destination. The header can further include network protocol identifiers, which describe the version number of the protocol that is to be used to transmit the information through and amongst networks. Moreover, the header can contain information identifying the port on the source computer from which the packet was sent and the port on the destination computer to which the packet is to be sent.

One type of network device that transmits data packets and their associated headers amongst network elements are known as "routers." In order to be transmitted from a one network to another, a data packet is typically routed by a plurality of routers that are each connected to other routers, public networks, private networks and/or individual server/client computers.

Routers often include a routing table that specifies the manner in which the various routers are connected to one another. Routers can implement a dynamic routing process wherein each router exchanges with other routers a routing protocol (such as Routing Information Protocol (RIP) and/or Open Shortest Path First (OSPF)) update on a periodic basis, commonly once every thirty seconds. The route updates provides information regarding the paths by which the router is currently connected to other routers and networks. Upon receipt of routing update packets, such as a RIP or OSPF update, each router can process the update and record any new routing information, or networks path descriptors, into its routing table.

Routers can have an open network ("ON") architecture wherein the router includes a control element that creates and manages the routing protocols and a separate forwarding element that forwards the packets pursuant to information specified in an associated routing table, sometimes called a routing information base (RIB). In such architectures, there may be multiple forwarding elements managed by a single control element, in which case each forwarding element can contain both an RIB and a forwarding information base (FIB) specifying via known labeling protocols the paths between various forwarding elements. Routing errors can occur if RIB and FIB updates are implemented at different times by the various forwarding elements controlled by the single control element. For instance, if a packet is received by a router that is processing RIB and FIB updates, the packet could be transmitted by an "updated" forwarding element to an "un-updated" forwarding element that drops the packet because it has not yet processed the RIB or FIB update.

DESCRIPTION OF DRAWINGS

Like reference symbols in the various drawings indicate like elements.

DETAILED DESCRIPTION OF ILLUSTRATIVE EMBODIMENTS

A system for updating routing and forwarding information can be realized in, for example, an open network system having a single control element and multiple forwarding elements. A routing update can be received by a route management component in the control element, which in turn determines whether the FIB should be updated in order to facilitate the route update. An Inter-forward element (Inter-FE) forwarding management component can derive any necessary updates to the FIB and the Route Management Component can derive any necessary updates to the RIB. Both the RIB update and FIB updates can be cached by route installers and label installers associated with each FE. If and when all RIB updates and FIB updates are received in the associated caches of each forwarding element, the control element can transmit a COMMIT signal to each forwarding element, at which time the management modules of each of the forwarding elements can install the RIB and FIB updates in parallel.

Figure 1:
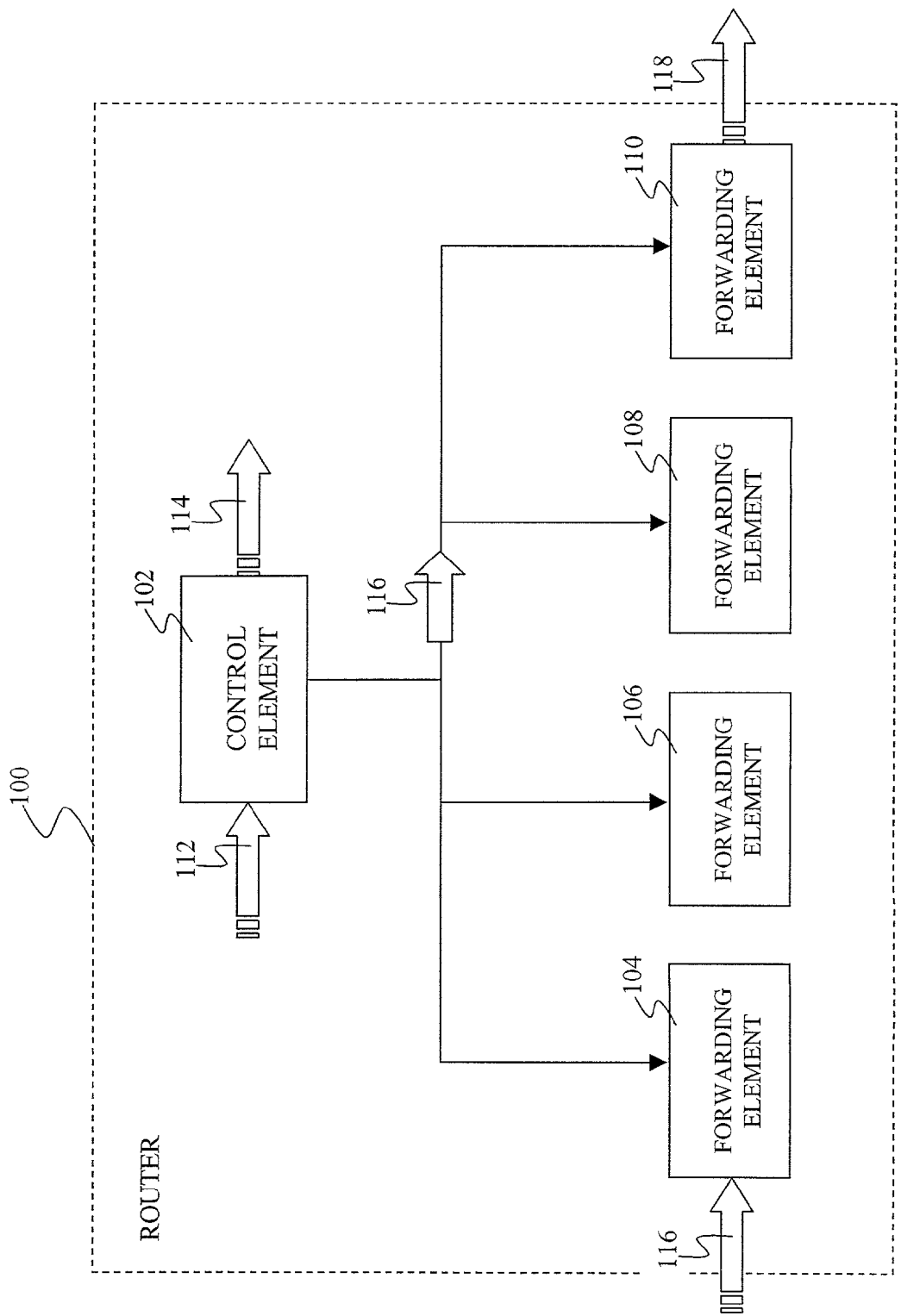
FIG. 1 is a block diagram of an illustrative router with physically separated control and forwarding planes.

FIG. 1 shows an illustrative router architecture 100 in which a control element 102 is located on a physically separate platform from the forwarding elements 104–110. The control element is a combination of hardware (such as microprocessor and memory elements) and software configured to receive routing updates 112 in the form of RIP updates or OSPF Link State Advertisements (LSA) from peer routers (not shown). The control element 102 processes the route updates 112 and forwards updated routing information, such as RIB updates and FIB updates, to forwarding elements 104–110. The control element 102 can also generate and transmit RIP updates 114 to peer routers (not shown). The forwarding elements 104–110 can be a combination of hardware (such as microprocessor and memory elements) and software configured to transmit and route data. The forwarding elements 104–110 can be connected to one or more external networks through one or more peer routers (not shown). The forwarding elements 104–110 implement and enforce both the RIB and FIB received from the control element 102. The RIB governs the data flow 116 into the ingress forwarding element 104 and the data flow 118 from the egress forwarding element 110 on layer 3 in an OSI model. The FIB governs the exchange 116 of information such as data packets between and amongst forwarding elements 104–110 on layer 2.5 (label switching) or layer 2. The router 100 can be connected to other routers associated with private networks (such as intranets, VPNs, LANs, WANs and the like) and/or public networks (such as the Internet). The control element is said to reside in the control plane of the router and forwarding elements are said to reside in the forwarding plane of the router.

Figure 2:
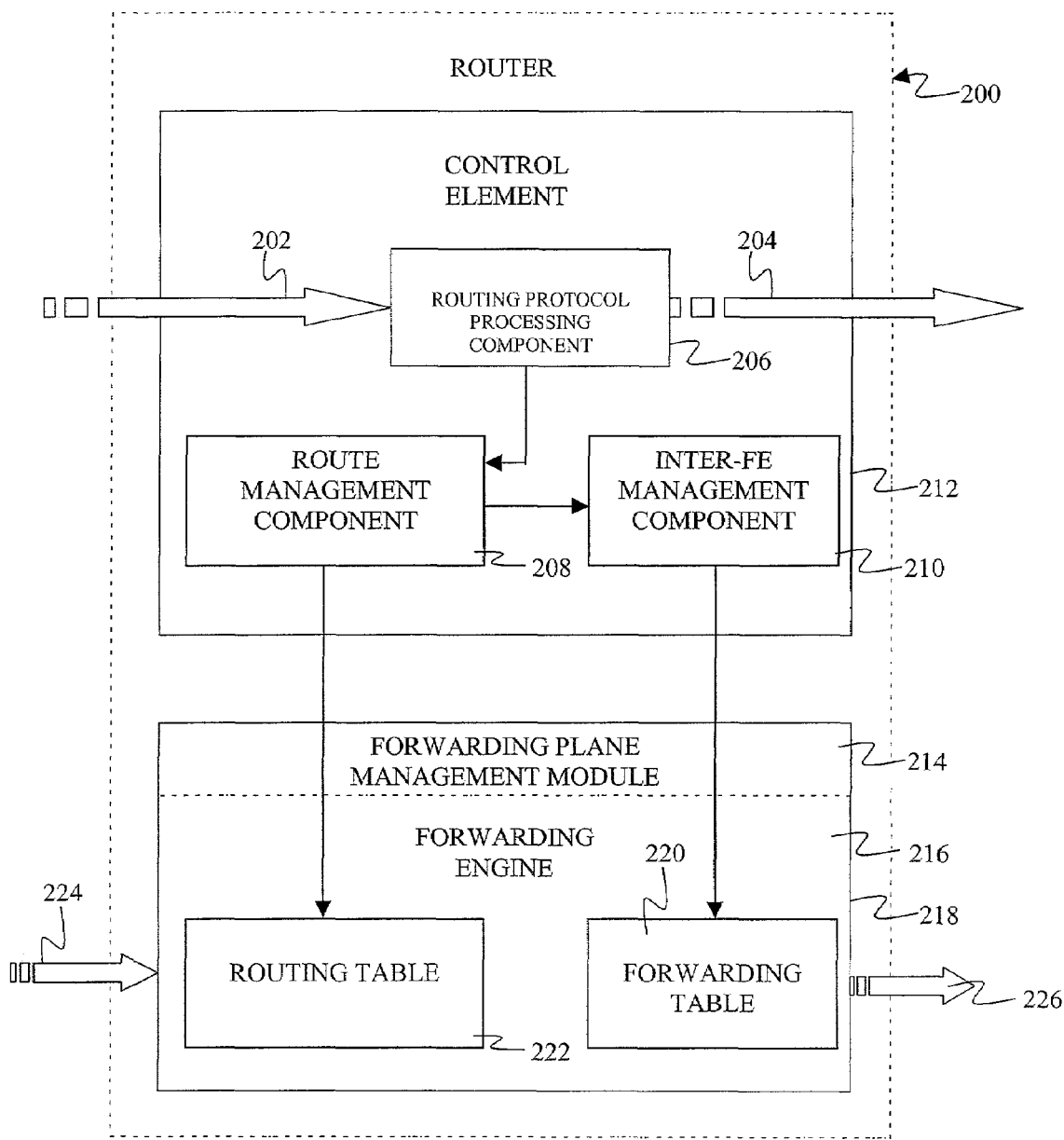
FIG. 2 is a block diagram illustrating a representative open network router.

FIG. 2 depicts in an exemplary router 200 that includes control element 212 that is connected to a forwarding element 218. The control element 212 includes a routing protocol processing component 206 connected to or integral with a route management component 208. The route management component is connected to an inter-FE management component 210. In this example the forwarding elements reside on physically separate platforms. Forwarding element 218 includes a management module 214 and forwarding engine 216. In the forwarding engine reside a routing table 222, sometimes referred to as an RIB, and a forwarding table 220, which can similarly referred to as an FIB.

In operation, the routing protocol processing component 206 receives a route update such as a RIP update or an OSPF link state update. The routing protocol processing component 206 transmits the route update information to a route management component 208 through an application program interface (API). The route management component 208 queries the route update information to determine whether any incoming packets are to be routed through different egress forwarding elements. If so, then the route management component 208 transmits the route update information to the inter-FE management component 210. The route management component 208 and the inter-FE management component 210 derive any necessary RIB and FIB updates, respectively. The RIB update is transmitted from the route management component 208 to the forwarding engine in the form of an updated routing table, as will be described in more detail below. Below it will also be further explained how the FIB update is transmitted from the inter-FE management component 210 to the forwarding engine in the form of an updated forwarding table. Data 224 is received by the forwarding engine 216 from either an external network component connected to the router 200 or from one of the peer forwarding elements in the router 200. The data is either transmitted 226 to another FE pursuant to the rules set forth in the forwarding table (FIB) 220 or to an external network component pursuant to the rules set forth in the routing table (or RIB) 222.

Figure 3:
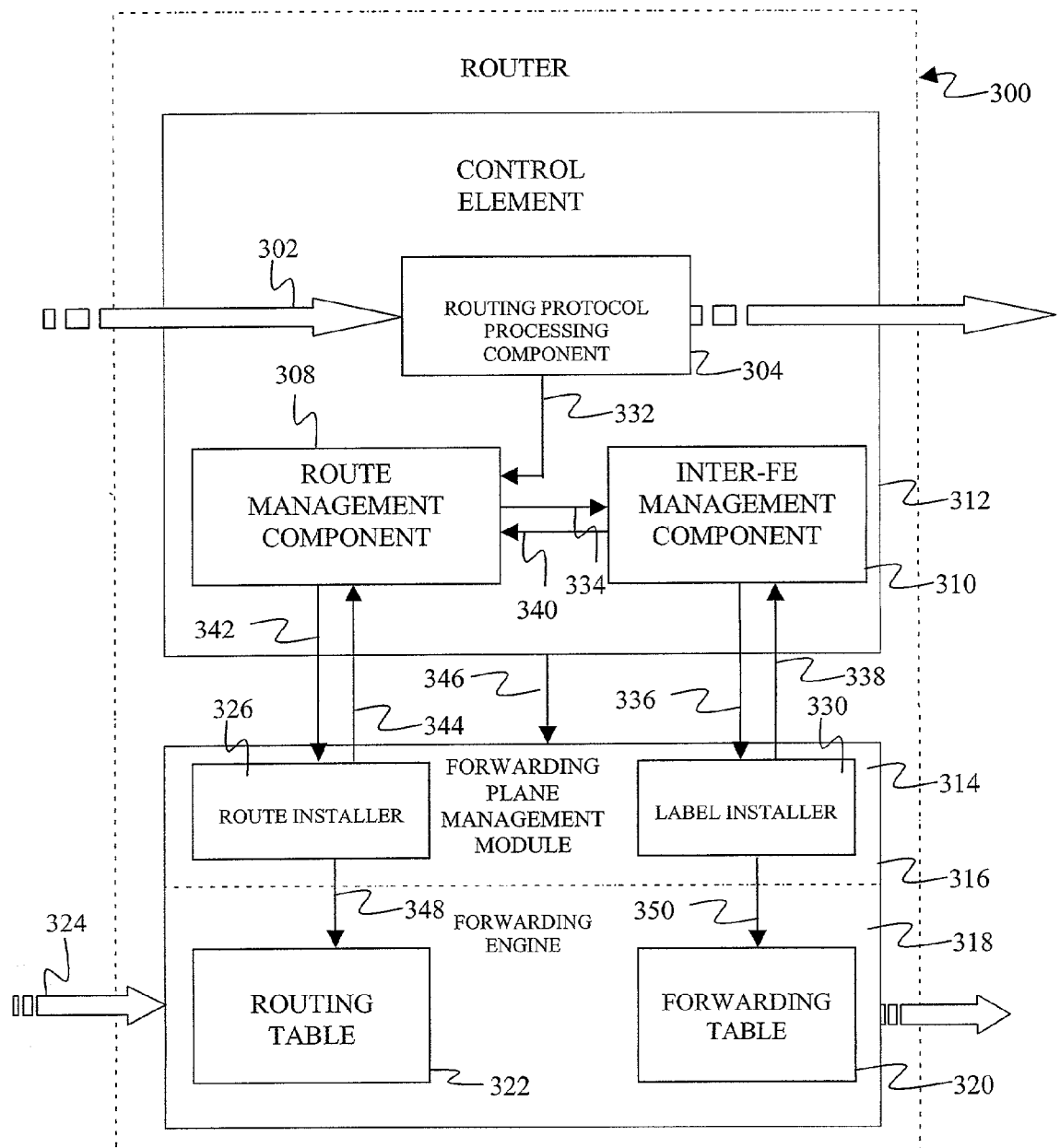
FIG. 3 is a block diagram illustrating the transactional installation of routing and forwarding updates in the open network router of FIG. 2.

FIG. 3 depicts the transactions associated with RIB and FIB updates in an exemplary router 300 which is in this case has an open network, or ON, architecture. As was the case for router 200, router 300 includes a control element 312 on which resides a routing protocol processing component 304 and an associated route management component 308 and inter-FE management component 310. The router 300 also includes on a separate platform a forwarding element 316 that includes a forwarding plane management module 314 and forwarding engine 318. In the forwarding plane management module 314 resides a route installer 326 and a label installer 330, which respectively derive and transmit RIB 322 and FIB 320 to the forwarding engine 318.

The updating transactions can optionally proceed as follows. Routing protocol processing component 304 receives (302) a routing update that can include a RIP update or other updated routing information. The routing protocol processing component 304 passes(332) to the route management component 308 the routing update. The route management component 308 evaluates, for example, the egress port information in the updated routing specifications to determine whether the route information needs to be transmitted to the inter-FE management component 310 for derivation of updated forwarding information. If new egress ports are specified, then the route management component 308 can transmit (334) the updated routing information, or information derived therefrom, to the inter-FE management component 310 for derivation of updated forwarding information.

Upon receipt of the updated routing information, inter-FE management component 310 derives a label update request that specifies the updated paths amongst the various forwarding elements connected to and controlled by the control element 312. The inter-FE management component 310 then transmits (336) the update label request to the label installer 330. The label installer caches the update request and returns (338) a CACHE COMPLETE signal to the inter-FE management component 310. After receiving CACHE COMPLETION from all FEs, the inter-FE management component 310 then transmits a LABEL UPDATE READY signal (340) to the route management component 308.

Continuing with the exemplary set of routing transactions, the route management component 308 sends the original route update request (342) to the route installers 326 in the management module 314 of each of the forwarding elements 316 connected to control element 312. The route installers 326 cache the update request and return a CACHE COMPLETE signal (344) to the route management component 308.

After receipt of CACHE COMPLETE signals from all of the forwarding elements 316 connected to control element 312, the route management component 308 sends a COMMIT command (346) to each of the forwarding elements 316. The route installers 326 and label installers 330 in the FEs then transmit (348, 350) the cached RIB and FIB, respectively, to the forwarding engine 318. The forwarding engine 318 can then execute the instructions set forth in the routing table and forwarding table upon receipt of a network packet.

Figure 4A:
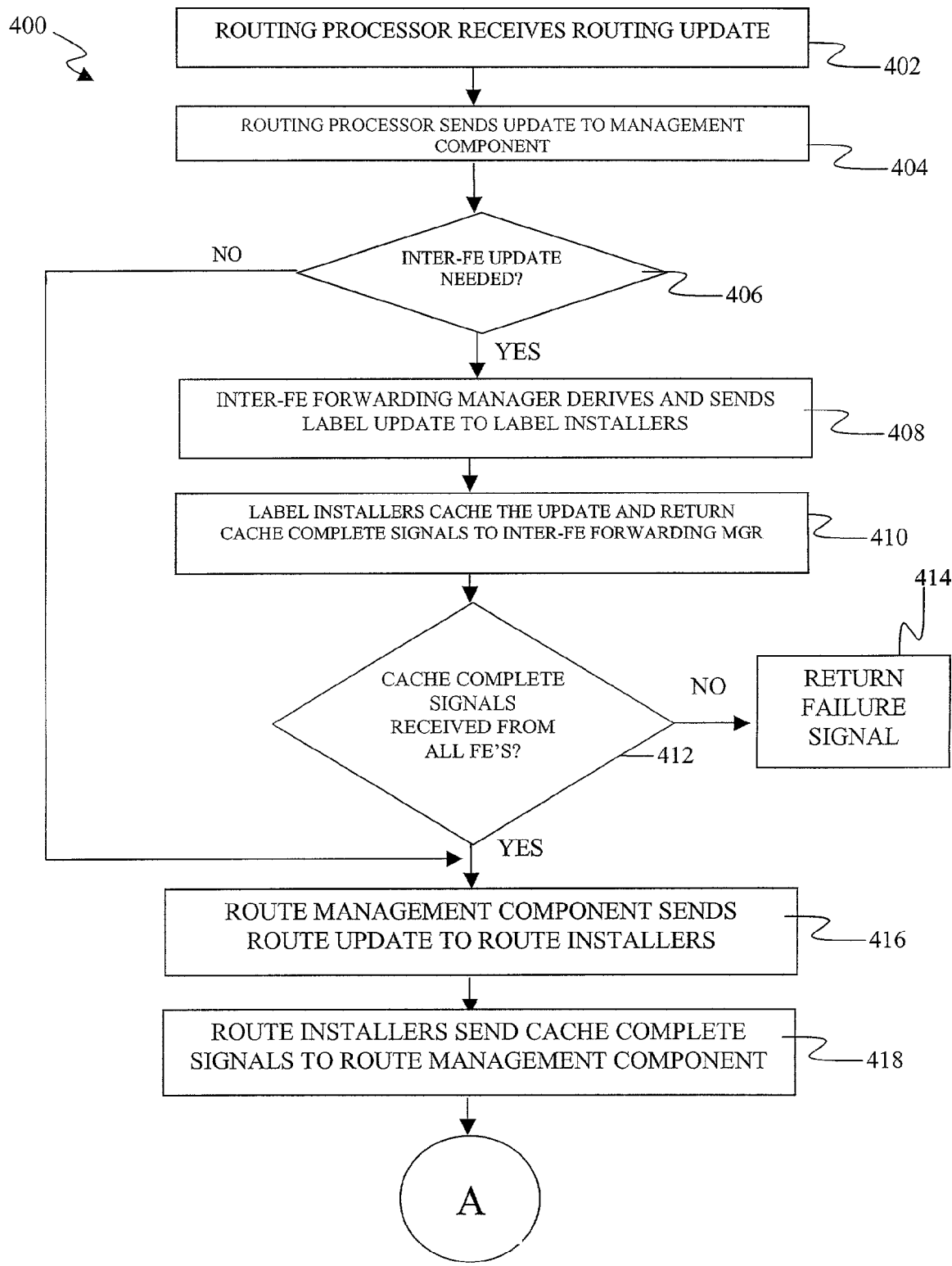
FIG. 4A is a flow diagram illustrating the process of updating routing and forwarding information in the exemplary system shown in FIG. 3.
Figure 4B:
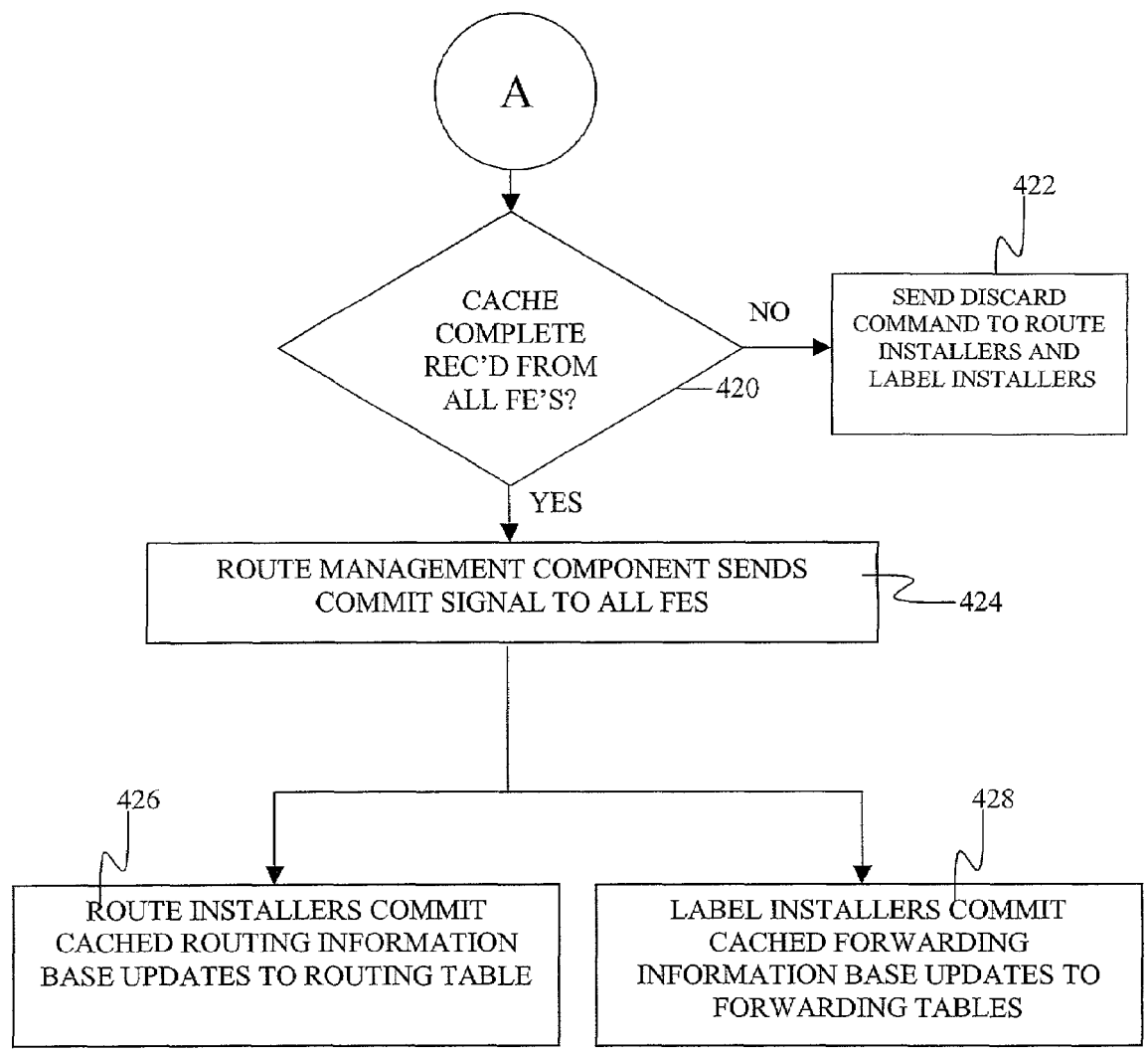
FIG. 4B is a continuation of the flow diagram of FIG. 4A.

The flow diagram of FIGS. 4A and 4B further illustrates certain aspects the exemplary route update transactions described above in connection with the embodiments shown in FIGS. 1–3. Transaction protocol 400 begins with the receipt of an external routing update, such as a RIP datum packet or an OSPF update (402). A routing protocol processing component then sends the update information to a route management component (404). Usually, the routing protocol processing component does not receive information concerning the interconnection between control and forwarding elements or the topology of the forwarding elements. The route management component then determines whether an inter-FE label update is needed (406), which can be dictated by the topology of the FEs on the forwarding plane. If no forwarding label update is needed, then the route management component next sends the route update information to the route installers associated with each forwarding element (416) through the steps described in the previous paragraphs.

However, if an FIB update is required, the route management component transmits the route update information to an inter-FE management component, which in turn derives a label-based FIB update and transmits it to the label installers. In the embodiment of FIGS. 2–3, the label installers do not immediately install the updated FIB in the forwarding engine. Rather, the label installers cache the FIB update and send a CACHE COMPLETE signal to the inter-FE management component (410) in the CE. The inter-FE management component awaits the receipt of CACHE COMPLETE signals from all FEs (412). If such signals are not received within a predetermined interval or if error signals are instead received from the label installers, the inter-FE management component sends a FAILURE signal pursuant to which the label installers eject or clear any cached FIBs. Alternately, if the inter-FE management component receives all expected CACHE COMPLETE signals, the inter-FE management component sends a LABEL UPDATE READY signal to the route management component.

Then the route management component then derives and transmits a route update request to the route installers associated with each forwarding element (416). The route installers send CACHE COMPLETE signals to the route management component when they are finished caching the route update request With reference to FIG. 4B, the illustrative transactional protocol continues with a determination by the route management component as to whether all route installers have responded with CACHE COMPLETE signals (420). If not, the route installer sends DISCARD commands to each FE pursuant to which the route installers and label installers clear any cached RIB or FIB updates from memory (422).

If all FEs return CACHE COMPLETE signals, then the route management component sends a COMMIT signal to the management module of each forwarding element (424). The management module then directs the route installers and label installers to commit their cached RIB and FIB entries to the forwarding engine, preferably in a substantially simultaneous manner (426, 428) across all FEs.

The foregoing techniques and systems can be implemented in a wide variety of network architectures to effectively update routing information according to an almost limitless number of specific transactional protocols. The routers need not have an ON architecture, but rather can have control and forwarding planes residing on the same physical platform. The techniques described herein can be applied across multiple routers that each have only a single forwarding element but collectively have a plurality of forwarding elements. The route update information can be any parameter or datum associated with the handling of a packet, although in preferred embodiments the update information includes an RIP updates, OSPF link status updates. Each control element can optionally control only a single forwarding element. Alternately, multiple control elements can be connected to a single forwarding element. The forwarding elements need not transfer packets directly from the ingress to the egress port. In certain implementations it may be necessary or desirable to transmit or contingently transmit packets through one or more intermediate forwarding elements.

The components and planar separation of the forwarding and control elements discussed above are merely preferred arrangements—the various components and/or their functions can be relocated to other planes or elements or can be combined with one another. As an example, the routing protocol processing module, route management component, and/or inter-FE forwarding component can be integrated into a single program element if desired. Similarly, aspects of the forwarding management module and forwarding engine can be combined if desired. The route installer and label installer need not be separate components, yet optionally can not only be separate components but can further be located on physically separate platforms associated with a single forwarding element. The forwarding table and routing table are preferably maintained as discrete elements in the forwarding engine in the aforementioned embodiments, but if desired the RIB and FIB can be integrated into a single table.

Similarly, it will be apparent to those skilled in the art that the specific protocols described above, and their particular sequencing, are merely illustrative embodiments selected for the particular network architecture and control/forwarding elements illustrated in FIGS. 2–3. For instance, there is no requirement that the FIB updates be cached prior to the RIB updates. Nor is there any requirement that the FIB and RIB updates be cached at all—they can merely be processed in parallel to obtain one or more of the following advantages. As noted above, the routing information provided in the exemplary FIBs and RIBs discussed above can be combined, in which case the relative timing of FIB and RIB commitment becomes moot. In the case of integrated route installers and label installers, there is no need to implement separate RIB and FIB caching protocols. As a further example, the control of the relative timing of route update commitments can be managed by one or more synchronized components on the management plane of a plurality of forwarding elements.

While the above description has been directed primarily to routers, the above techniques can be used to implement updates in any number of network applications, such as administrative updates to client computers in an intranet, LAN, WAN or VPN.

The foregoing techniques can be implemented in an almost limitless number of additional manners dictated by particular network environment(s), transfer protocols, and other design parameters. The foregoing proposed modifications will be understood as merely illustrative by those skilled in the art. It will be understood that various modifications may be made without departing from the spirit and scope of the invention. Accordingly, other embodiments are within the scope of the following claims.

The systems and methods described herein may have certain of the following functionalities, depending on the particular implementation. In selected embodiments, the foregoing systems and methods improve consistency between the forwarding information and routing information implemented by a given forwarding engine by reducing the time gap between commitment of an RIB update and an associated FIB update. In certain embodiments the foregoing techniques improve the consistency of routing behavior between and amongst forwarding elements by committing RIB updates substantially simultaneously. This in turn reduces the likelihood and/or frequency of dropped or mis-routed packets. Still other embodiments promote consistent forwarding behavior between and amongst forwarding elements. Forwarding loops that can result of transient FIB states is reduced by substantially simultaneously committing FIB updates by a plurality of local calls triggered by a global commit command. Furthermore, many embodiments provide the aforementioned fail-safe arrangement whereby a route update is aborted if any component involved in implementation the routing and forwarding updates is unable to commit the update in the manner or at the time desired. A router equipped with the above-described components can therefore be optionally configured to "rollback" to a previous routing state in the event any error occurs during an update process.

What is claimed is:

1. A forwarding system comprising:
   a plurality of forwarding elements within a router to receive and transmit data,the forwarding elements coupled to two or more external networks through one or more peer routers; and
   a control element to receive and process mute updates, said control element being connected to said forwarding elements and including at least one route management component to
   transmit one or more route updates to the forwarding elements, and synchronize the commitment of the route updates by at least a plurality of the forwarding elements.

2. The system of claim 1, wherein the route updates include both external routing information updates and internal forwarding information updates.

3. The system of claim 1, wherein the route updates include filter rule updates.

4. The system of claim 1, wherein the control element and forwarding elements are part of an open network router.

5. The system of claim 1, wherein the control element and forwarding element are part of a single router.

6. The system of claim 1, wherein the control element and forwarding element reside on the same physical platform.

7. The system of claim 1, wherein at least one of the forwarding elements is connected to a plurality of control elements.

8. The system of claim 1, wherein the forwarding element include forwarding plane management modules and forwarding engines, and wherein the management modules commit the route update to the forwarding engines.

9. The system of claim 1, wherein a management component associated with the control element includes a forwarding element management module to synchronize forwarding information updates.

10. A computer-accessible readable medium with computer executable instructions stored thereon that, when accessed, performed the following operation:
    receive and process route update information;
    transmit one or more route updates to a plurality of forwarding elements within a router, the forwarding elements coupled to two or more external net works through one or more peer router; and
    synchronize the commitment of the route updates by at lest a plurality of the forwarding element.

11. The article of claim 10, further comprising instructions to cause the forwarding elements to cache the route updates until receipt a commit signal.

12. The article of claim 10, further comprising instructions to transmit route updates that include both external routing information updates and internal forwarding information updates.

13. The article of claim 10, further comprising instructions to transmit route updates that include filter rule update.

14. The article of claim 10, further comprising instructions operable to cause one or more control elements connected to the forwarding elements to receive and process route update information.

15. The article of claim 14, wherein a control element and a plurality of the forwarding elements are part of an open network router.

16. The article of claim 10, further comprising instructions to synchronize the commitment by transmission of a synchronized signal to the forwarding elements.

17. The article of claim 16, further comprising instructions operable to cause a control element connected to the forwarding elements to generate the synchronized signal.

18. The article of claim 10, further comprising instructions to cause programmable processors to receive signals from forwarding elements confirming the receipt of route update information.

19. The article of claim 18, further comprising instructions to synchronize the commitment by transmission of a synchronized signal to the forwarding elements.

20. The article of claim 19, further comprising instructions operable to cause a control element connected to the forwarding elements to generate the synchronized signal.

21. A routing method, comprising:
    receiving and processing route update information;
    transmitting one or more route updates to a plurality of forwarding elements within a router, the forwarding elements coupled to two or more external networks through one or more peer routers; and
    synchronizing the commitment of the route updates by at least a plurality of the forwarding elements.

22. The method of claim 21, further comprising caching the route updates until receiving a synchronized signal.

23. The method of claim 21, wherein the route updates include both external routing information updates and internal forwarding information updates.

24. The method of claim 21, wherein the route updates include filter rule updates.

25. The method of claim 21, wherein the route update information is processed by one or more control elements connected to the forwarding elements.

26. The method of claim 25, wherein a control element and a plurality of the forwarding elements are part of an open network router.

27. The method of claim 21, wherein the commitment is synchronized by transmission of a commit signal to the forwarding elements.

28. The method of claim 27, wherein the commit signal is generated by a control element connected to the forwarding elements.

29. The method of claim 21, further comprising receiving signals from forwarding elements confirming the receipt of route update information.

30. The method of claim 29, wherein the commitment is synchronized by transmission of a commit signal to the forwarding elements.

31. The method of claim 30, wherein the commit signal is generated by a control element connected to the forwarding elements.

* * * * *

UNITED STATES PATENT AND TRADEMARK OFFICE
CERTIFICATE OF CORRECTION

| | |
|---|---|
| PATENT NO. | : 7,209,449 B2 |
| APPLICATION NO. | : 10/109558 |
| DATED | : April 24, 2007 |
| INVENTOR(S) | : Puqi Tang and Hsin-Yuo Liu |

It is certified that error appears in the above-identified patent and that said Letters Patent is hereby corrected as shown below:

Claim 1
    Column 6, line 54:
    delete "data,the", and replace with --data, the --

Column 6, line 57:
    delete "mute", and replace with -- route --

Claim 8
    Column 7, line 12:
    delete "element", and replace with -- elements --

Column 7, line 15:
    delete "update", and replace with -- updates --

Claim 10
    Column 7, line 22:
    delete "performed", and replace with -- perform --

Column 7, line 26:
    delete "net works", and replace with -- networks --

Column 7, line 29:
    delete "lest", and replace with -- least --

UNITED STATES PATENT AND TRADEMARK OFFICE
CERTIFICATE OF CORRECTION

PATENT NO. : 7,209,449 B2
APPLICATION NO. : 10/109558
DATED : April 24, 2007
INVENTOR(S) : Puqi Tang and Hsin-Yuo Liu It is certified that error appears in the above-identified patent and that said Letters Patent is hereby corrected as shown below:

Claim 13
    Column 7, line 38:
    delete "update", and replace with -- updates --

Signed and Sealed this

Seventh Day of October, 2008

JON W. DUDAS
*Director of the United States Patent and Trademark Office*